United States Patent [19]

Kim

[11] Patent Number: 5,844,635
[45] Date of Patent: Dec. 1, 1998

[54] CATHODE RAY TUBE MOUNTING STRUCTURE

[75] Inventor: Kwan-sup Kim, Suwon, Rep. of Korea

[73] Assignee: Samsung Electronics Ltd., Suwon, Rep. of Korea

[21] Appl. No.: 586,239

[22] Filed: Jan. 16, 1996

[30] Foreign Application Priority Data

Jan. 17, 1995 [KR] Rep. of Korea .......................... 95-665

[51] Int. Cl.[6] .............................. H04N 5/645; H04N 5/64
[52] U.S. Cl. ........................... 348/826; 348/825; 348/836
[58] Field of Search ................................... 348/825, 826, 348/836; D14/113, 126; 312/7.2; 345/905

[56] References Cited

U.S. PATENT DOCUMENTS 4,646,159  2/1987  Beaumont et al. ...................... 348/826
5,084,757  1/1992  Leo et al. ................................. 348/826

*Primary Examiner*—Edward L. Coles, Sr.
*Assistant Examiner*—Kimberly A. Williams
*Attorney, Agent, or Firm*—Banner & Witcoff, Ltd.

[57] ABSTRACT

A cathode ray tube mounting structure comprising a supporter secured to the cathode ray tube and an elevated seat formed at each side of the front portion of a printed circuit board mounting bracket for mounting the supporter. The printed circuit board mounted bracket is secured to a bottom cover or wall member and supported by a brace and ribs formed thereon. The cathode ray tube mounting structure of the present invention supports the weight of the cathode ray tube in a more evenly distributed manner and thereby prevents the monitor case from cracking or deforming to increase product reliability.

6 Claims, 3 Drawing Sheets

CATHODE RAY TUBE MOUNTING STRUCTURE

BACKGROUND OF THE INVENTION

The present invention relates to a structure for mounting a cathode ray tube to a monitor case, and particularly to a cathode ray tube mounting structure having a bracket for stably supporting the cathode ray tube on a printed circuit board bracket that is mounted to the bottom of a monitor case.

Conventionally, a cathode ray tube has four lugs, each disposed at a corner portion of an integrated metal band that extends around the periphery of the screen of the cathode ray tube. A front cabinet portion to be mounted on the front side of the cathode ray tube is provided with four corresponding attachment segments. The cathode ray tube with the metal band and front cabinet portion are assembled into a shield case of a monitor by aligning and attaching the lugs and corresponding attachment segments onto a bracket of the shield case with screws so that a joint portion results in each of the four corners of the assembly.

Typically, the cathode ray tube is the heaviest element of a monitor, for example the weight of the cathode ray tube in a 17 inch monitor can be as high as 13 kg. The load of such heavy weight is concentrically applied to the joint portions which causes the joint portions, particularly the lower ones to crack or deform during an assembling process or during the use of the monitor thereby lowering product reliability.

SUMMARY OF THE INVENTION

Therefore, it is an object of the present invention to provide a mounting structure for mounting a cathode ray tube to a monitor case wherein the weight of the cathode ray tube is more evenly distributed and better supported and the cathode ray tube more easily assembled.

To accomplish the object of the present invention, a mounting structure for mounting a cathode ray tube in a monitor case comprises a supporter for supporting the cathode ray tube from below, the supporter having upwardly slanted end portions, each slanted end portion forming a flange secured to a lug provided at the lower corner of the screen of the cathode ray tube; an elevated seat formed at each side of the front portion of a printed circuit board mounting bracket for mounting the supporter, the supporter being secured to each of the seats, and the printed circuit board mounting bracket mounted to the bottom the monitor case.

These and other features and advantages of the invention may be more completely understood from the following detailed description of the preferred embodiment of the invention with reference to the accompanying drawings.

DETAILED DESCRIPTION OF THE PREFERRED EMBODIMENT

Figure 1:
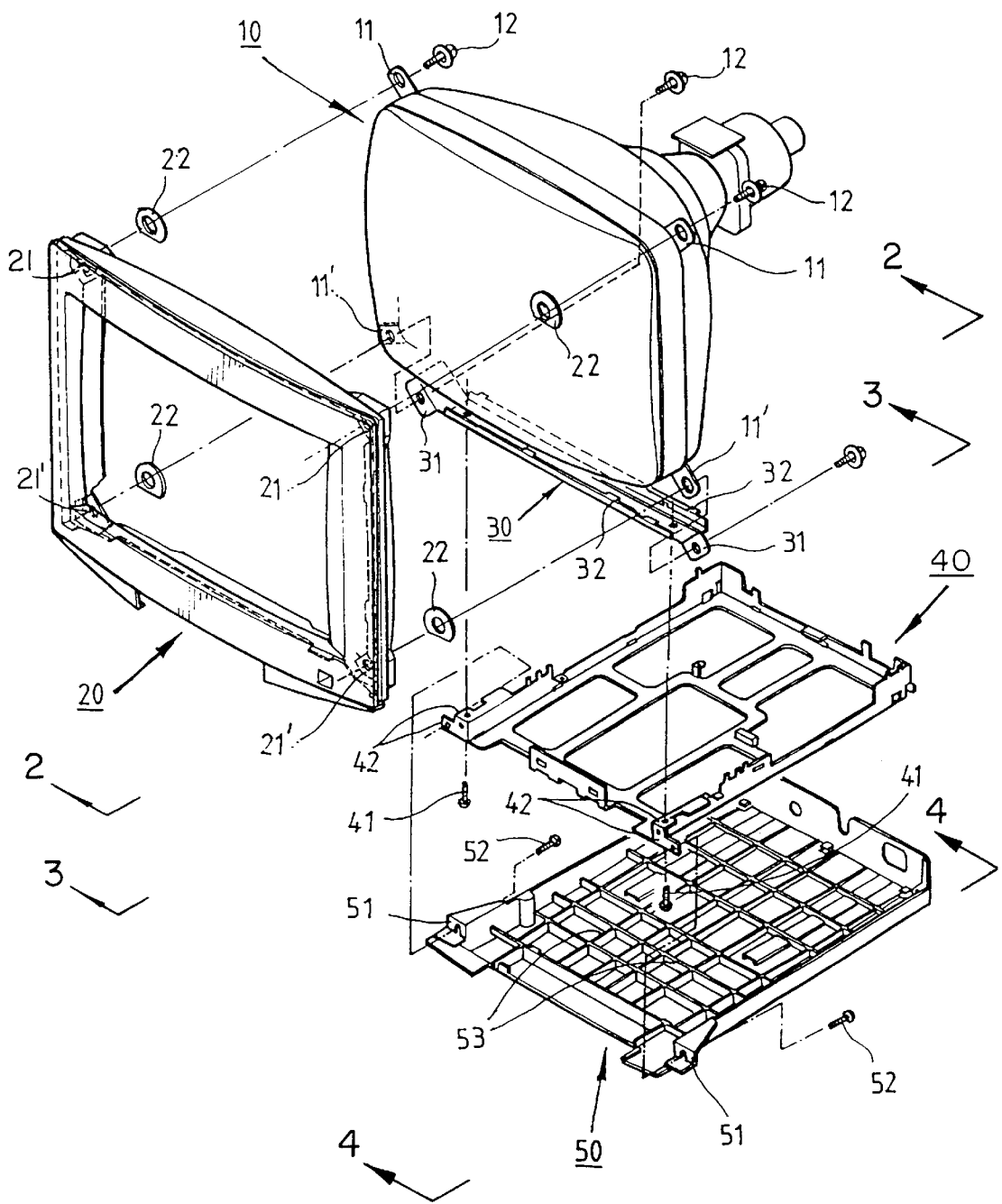
FIG. 1 is an exploded perspective view of a cathode ray tube mounting structure according to the present invention.

Referring to FIG. 1, a cathode ray tube 10 to be housed in a monitor case (not shown) has upper and lower lugs 11 and 11' at the corners thereof for securing a front cabinet portion 20 thereto. Attachment segments 21 and 21' of front cabinet portion 20 correspond to lugs 11 and 11' of cathode ray tube 10. As the mounting structure of the present invention is primarily concerned with the lower part of the cathode ray tube assembly, it is to be understood that upper lugs 11 and corresponding attachment segments 21 are assembled in the usual manner including washers 22 disposed therebetween.

The mounting structure of the present invention includes a generally horizontal supporter 30 disposed below and extending along the front, bottom side of the screen of cathode ray tube 10. Supporter 30 has upwardly slanted end portions and each slanted end portion has a forwardly facing flange 31 formed thereon. Each flange 31 is angled and positioned to align with a bottom lug 11' when the mounting structure is assembled. The horizontal portion of supporter 30 includes upstanding walls 32 which form a shallow channel adapted to accommodate the lower portion of the metal band that extends around the screen.

Figure 2:
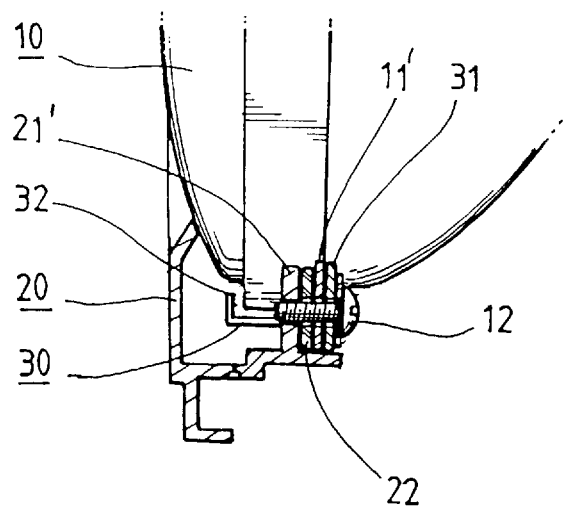
FIG. 2 is a sectional view taken along the lines A–A' of FIG. 1 showing a supporter and a front cabinet assembled to the cathode ray tube.

As shown in FIG. 2, front cabinet 20, supporter 30 and cathode ray tube 10 are assembled into a subassembly by driving a screw 12 through the corresponding aligned apertures of lugs 11' of cathode ray tube 10, attachment segments 21' of front cabinet 20 and flanges 31 of supporter 30. A washer 22 is provided between each of lugs 11' and attachment segments 21' of cathode ray tube 10 and front cabinet 20. Each flange 31 is configured to preferably be disposed to the rear of its corresponding lug 11' so as to sandwich each lug 11' between flange 31 and attachment segment 21'.

Figure 3:
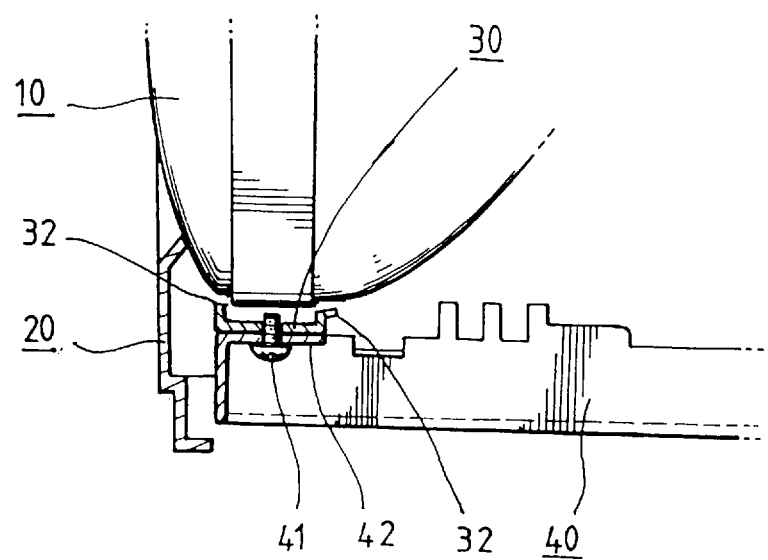
FIG. 3 is a sectional view taken along the lines B–B' of FIG. 1 showing a printed circuit board mounting bracket assembled to the subassembly in FIG. 2.

A bracket 40 for mounting a printed circuit board thereon is provided with an elevated seat 42 formed on parallel sides of bracket 40 adjacent the front end of bracket 40. Seats 42 are generally horizontal with a vertical portion to the front. The horizontal channel areas near the slanted end portions of supporter 30 are provided with mounting apertures that are positioned to align with corresponding apertures in each of seats 42. The subassembly of FIG. 2 is mounted onto seats 42 so that the mounting apertures align and are attached with screws 41 to support the subassembly (as shown in FIG. 3).

Figure 4:
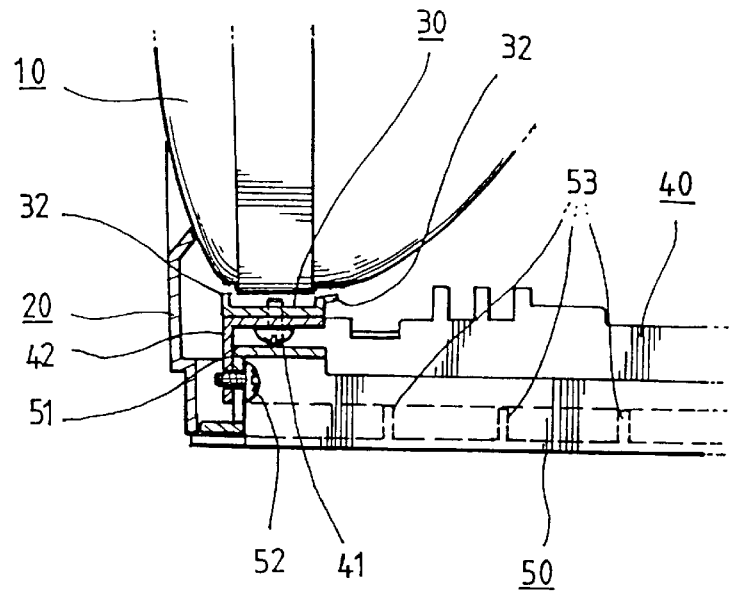
FIG. 4 is a sectional view taken along the lines C–C' of FIG. 1 showing a bottom cover member assembled to the subassembly in FIG. 3.
Figure 5:
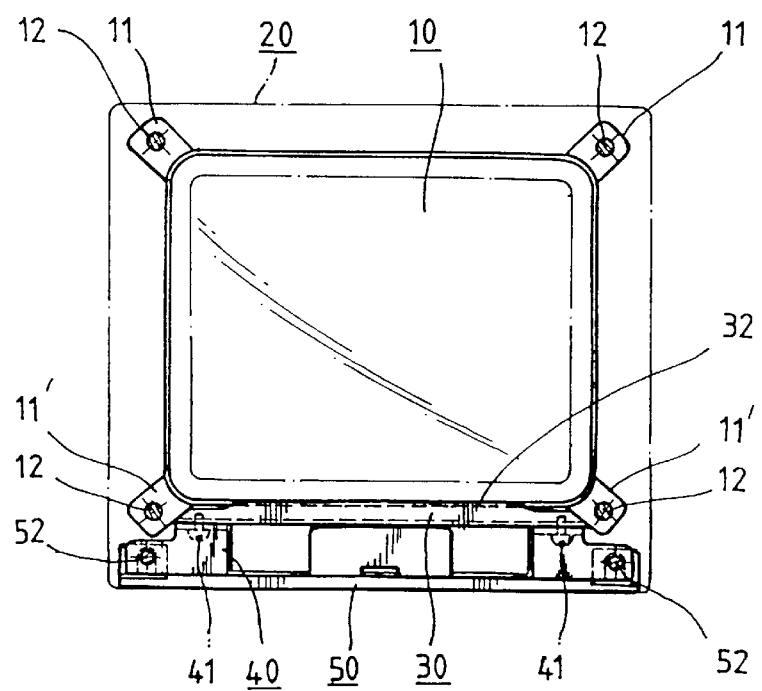
FIG. 5 is a front view of the assembly in FIG. 4.

As shown in FIG. 1, a bottom member 50 of the monitor is provided with a brace 51 formed at each side thereof to support seats 42 of bracket 40. Bottom member 50 also includes a plurality of reinforcing ribs 53 formed on the surface thereof so that the bottom surface of the printed circuit board bracket 40 may be entirely supported by ribs 53. Furthermore, printed circuit board bracket 40 is secured to bottom member 50 by driving screws 52 through apertures formed at each of the front vertical portions of seat 42 and a front vertical portion of brace 51 as in FIG. 4. FIG. 5 shows cathode ray tube 10 stably mounted on bottom member 50 through supporter 30 and printed circuit board mounting bracket 40.

As described above the cathode ray tube mounting structure of the present invention prevents the front cabinet, bottom cover member and back cover (not shown) from cracking or deforming since the weight of the cathode ray tube is distributed and supported more evenly by the supporter, seats of the printed circuit board mounting bracket and bottom cover member, and facilitates cathode ray tube mounting process to increase product reliability and productivity.

Having described the invention as related to the embodiment shown in the accompanying drawings, it is to be understood that the invention be not limited by any of the details of description, unless otherwise specified, but rather be constructed broadly within its spirit and scope as set out in the accompanying claims.

What is claimed is:

1. A cathode ray tube mounting structure for affixing a cathode ray tube to a printed circuit board mounting bracket within a monitor case having a bottom wall member, said mounting structure comprising:

a supporter secured to said cathode ray tube from below for supporting said cathode ray tube;

a pair of seats disposed on said printed circuit board mounting bracket for attaching said bracket to said supporter and the bottom wall member; and a pair of braces provided on the bottom wall member of the monitor, said braces disposed to align with said seats for attaching said seats to the bottom wall member, a plurality of reinforcing ribs formed on the bottom member for stably supporting said mounting structure and said cathode ray tube.

2. The cathode ray tube mounting structure as claimed in claim 1, wherein said supporter has slanted end portions, each slanted end portion including a flange to be secured to corresponding lower lugs of said cathode ray tube.

3. The cathode ray tube mounting structure as claimed in claim 2, wherein said printed circuit board bracket is secured to a brace provided on the bottom member.

4. A mounting structure for mounting a cathode ray tube on a printed circuit board bracket within a monitor case, said cathode ray tube including a metal band extending around the periphery of a screen portion, the metal band having lugs disposed at each corner of the screen portion for aligning with corresponding attachment segments of a front cabinet portion of the monitor case, the printed circuit board bracket being affixed to a bottom wall member of the monitor case, said mounting structure comprising a generally horizontal supporter extending below the screen portion of said cathode ray tube, said supporter forming a horizontal channel to receive and support the metal band of said cathode ray tube and having upwardly slanted ends, each slanted end having a vertical, forwardly facing flange with an aperture for aligning with corresponding ones of the lugs and the attachment segments, so that said supporter is attached to the lugs and the attachment segments to stably support said cathode ray tube; and an elevated seat formed on each of a pair of opposed side walls of the printed circuit board bracket, each said seat configured to align with a horizontal portion of said supporter adjacent said slanted ends to mount said supporter on said seats.

5. The mounting structure of claim 4, further comprising a vertical portion formed on each said seat and a corresponding vertical brace formed on the bottom wall member of the monitor case, wherein said seats and said braces are attached together to thereby mount said cathode ray tube within the monitor case.

6. The mounting structure of claim 5, wherein the bottom wall member of the monitor case includes a plurality of reinforcing ribs configured to receive thereon and support the printed circuit board bracket and said cathode ray tube.

* * * * *